Figure 1:
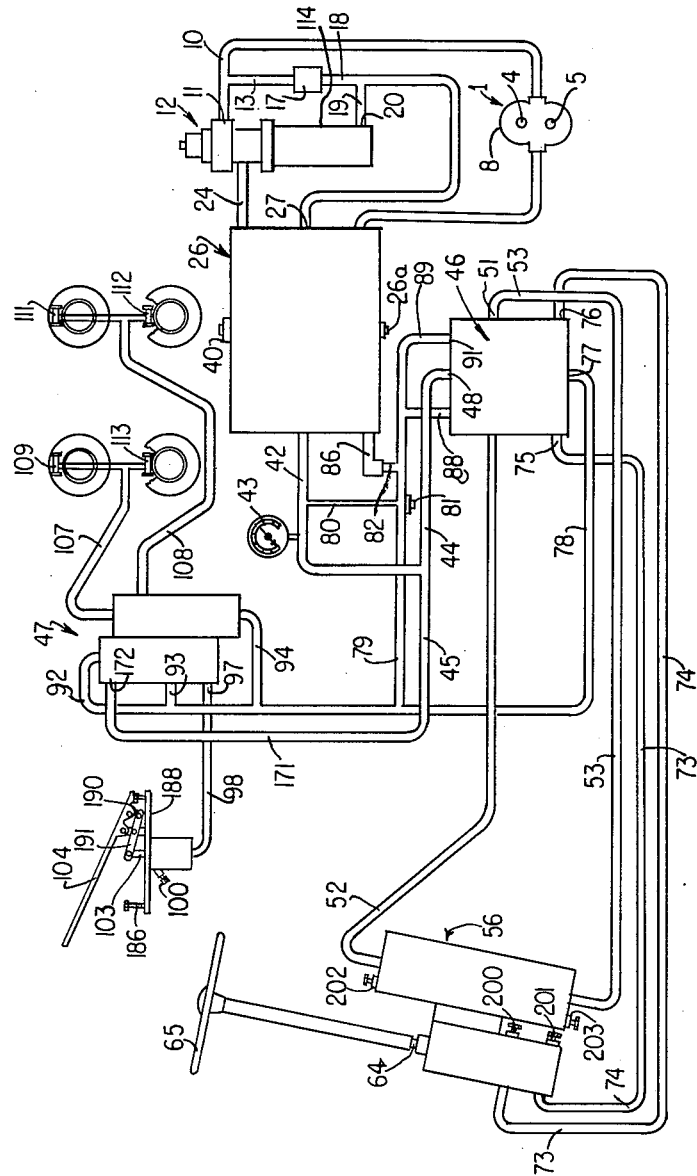

INVENTOR.
EDWARD A. ROCKWELL

June 4, 1963    E. A. ROCKWELL    3,091,931
HYDRAULIC SYSTEM
Original Filed July 2, 1954    3 Sheets-Sheet 2
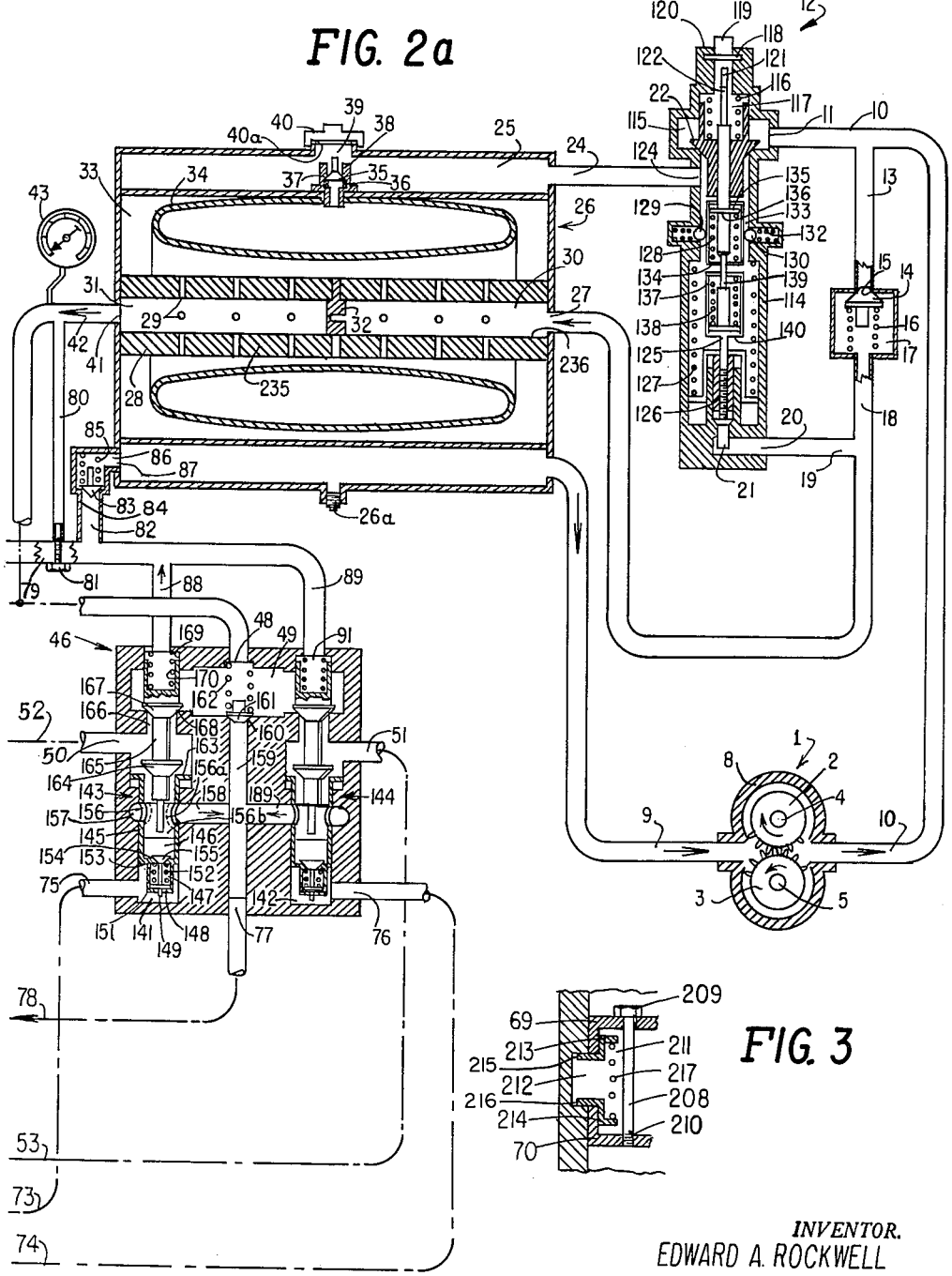
INVENTOR.
EDWARD A. ROCKWELL
BY
Wolfe, Hubbard, Voit & Osann.
ATTYS.

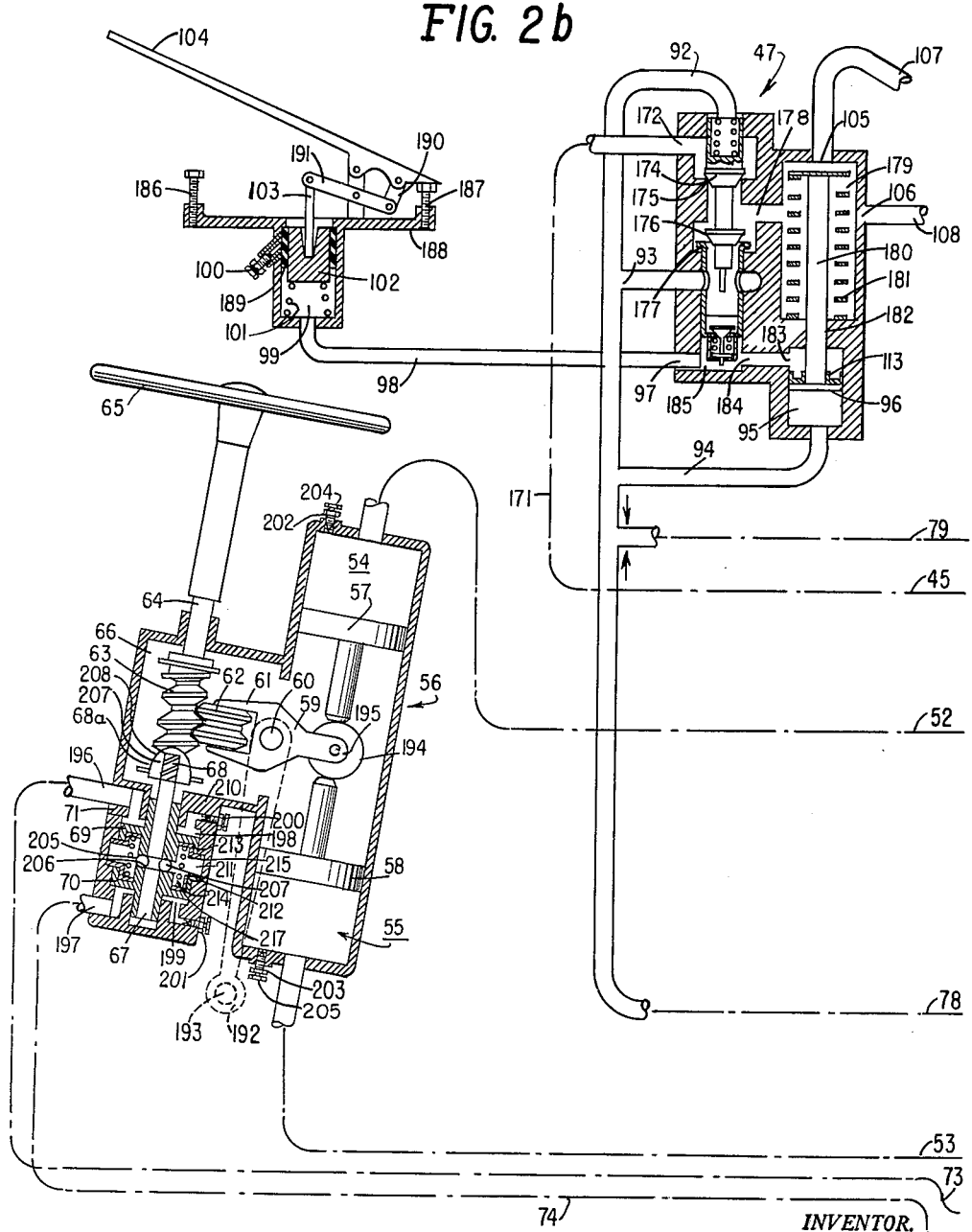

3,091,931
HYDRAULIC SYSTEM
Edward A. Rockwell, 167 Ashdale Place,
Los Angeles, Calif.
Original application July 2, 1954, Ser. No. 440,894, now Patent No. 2,919,715, dated Jan. 5, 1960. Divided and this application Dec. 31, 1959, Ser. No. 863,277
12 Claims. (Cl. 60—54.5)

This invention relates to hydraulic control systems and more particularly to a power steering and power brake control system for automotive vehicles.

It is a general object of the invention to provide a hydraulic control system which incorporates both low and high pressure circuit sections wherein an accumulator is provided for holding the pressure in both the high pressure sections and the low pressure sections.

Another more specific object is to provide means for bleeding the low pressure sections to maintain the latter free from entrapped air. Another object is to provide for replenishing fluid bled from the low pressure sections by adding fresh fluid through the accumulator to the high pressure sections.

This application is a division of my copending application Serial No. 440,894, filed July 2, 1954, now Patent No. 2,919,715.

Other objects and advantages will become apparent as the following description proceeds, taken in connection with the acompanying drawings, wherein:

FIGURE 1 is a diagrammatic view of a control system illustrating the invention;

FIGS. 2a and 2b together illustrate details of the system; and

FIG. 3 is a fragmentary section of a portion of the power steering unit master cylinder.

While the invention is susceptible of various modifications and alternative constructions, an illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

*General System Organization*

For exemplary purposes the present invention is shown in FIGURE 1 applied to a system for operating by means of power the brakes and steering apparatus of an automotive vehicle.

The system, disclosed in my Patent No. 2,896,666, has high pressure sections which are supplied with fluid from a source including a pump 1 and an accumulator 26 and are connected to power units for either the brakes or the steering apparatus for power operating the latter. A low pressure section is associated with each high pressure section and has manually operated master cylinders for modulating the pressure in the associated low pressure section, and control valves by which the manually directed modulation is employed to control the fluid in the high pressure sections and in this manner, the power units. Thus a low pressure brake section is included which has a treadle for operating a master cylinder, and a low pressure steering section included which has a master cylinder assembly operated by the steering wheel.

In the present system liquid compensation means is employed between each pair of high and low pressure sections for maintaining a residual pressure in the low pressure section. With this provision the low pressure sections are maintained filled with fluid supplied from the high pressure sections and, therefore, the accumulator 26. Each low pressure section, according to one of the principal features of this invention, is provided with a bleeder connection to bleed entrapped air from the fluid. The residual pressure in the low pressure section, held by the accumulator and liquid compensation means, is effective to force air and fluid through the bleeder connection when the latter is opened. To replenish fluid removed from the system by bleeding or through leakage, fresh fluid may be added through the accumulator.

*Source of Pressure Fluid*

Referring to the drawings, I have shown a diagrammatic representation of the accumulating apparatus in a system such as disclosed in my copending application Ser. No. 440,993, now Patent No. 2,896,733. For this purpose I have shown a gear pump 1 having two meshing gears 2 and 3 carried on shafts 4 and 5, respectively, one of which, for instance the shaft 4, may be constantly driven by a pulley or belt (not shown) driven from an internal combustion engine provided for driving the vehicle. The said gears 2 and 3 are located in a pump housing 8 mounted on the vehicle, so as to receive circulating hydraulic liquid of any desired kind from an inlet pipe 9 and discharge the same from an outlet pipe 10. The said liquid, under any desired pressure, is thence delivered by the pipe 10 to an inlet 11 in an unloading valve 12 which is constructed substantially like the unloading valve made in accordance with my invention as set forth in my Patent No. 2,372,016, granted March 20, 1945. Connected to the outlet pipe 10 there is also a branch pipe 13 having therein a check valve 14 normally pressed into seating position against a valve seat 15 by a helical spring 16, in a chamber 17 which is connected to a main supply or delivery pipe 18. This pipe 18, furthermore, has a branch pipe 19 which leads to an inlet 20 in the lower end of the unloading valve 12 so that when the pressure in the pipe 18 exceeds a certain amount it will operate on the end of a plunger 21 to move the same and thereby quickly open a by-pass valve 22 normally seated on a valve seat 23, in accordance with the further description, hereinafter, of the operation of the by-pass 12, and in accordance with the operation of the unloading valve shown and described in my Patent No. 2,372,016 aforesaid. When this occurs the hydraulic pressure liquid from the pipe 10 is released through a discharge pipe 24 from the unloading valve 12 to be returned to an outer annular heat-equalizing chamber 25 in a pressure accumulator 26 having a normally closed draw-off port 26a for moisture, etc., the said accumulator being described further hereinafter, and thence by the return pipe 9 to the inlet side of the gear pump 1.

The main supply of liquid under pressure is, thus, conveyed at a pressure not exceeding a desired maximum owing to the unloading valve 12, to an inlet port 27 on the accumulator 26 and thence into a cylinder 28 made of a strainer of any porous material permeable to a liquid or having a number of peripheral apertures 29, and which is divided between its ends into an inlet chamber 30 and an outlet chamber 31 by means of a partition 32. The liquid, thus, has access through the apertures 29 in the walls of the cylindrical chamber 28 to an inner annular chamber 33 containing an inflated annulus of rubber or rubber substitute 34, and which may be inflated to any particular desired pressure, suitable for acting as a compressible accumulator, through an air inlet valve 35 normally seated by a helical spring 36 on a valve seat 37 in a screw-threaded nipple 38, access through which is made available by means of an opening 39 having a screw cap 40 in the outer wall of the pressure accumulator 26, which may be perforated and provided with a packing 40a of any fibrous material which is permeable to gases but sufficiently tight to prevent the passage of liquids, and a perforated retaining disc 40b. In this way the pressure of the hydraulic liquid is maintained in the outlet chamber 31 by means of the compressible inflated annulus 34 so as to be delivered therefrom through an outlet port 41 and thence to a supply pipe 42 having a pressure indicator 43 thereon. This pipe 42 has branches 44 and 45 leading, respectively, to a valve-operating mechanism 46 for controlling the power steering of the vehicle, and to a brake-controlling valve mechanism 47 for operating the brakes by means of power.

Power Steering

The power steering valve mechanism 46, which will hereinafter be described further in detail, is comprised, in general, of an inlet 48 for the hydraulic fluid under pressure received from the accumulator 26, which enters a chamber 49 therein, so as to be released, as desired, from the said chamber 49 by an outlet port 50 or an outlet port 51 to pipes 52 and 53 leading, respectively, to a power cylinder 54 or a power cylinder 55 of a steering unit 56, which will be described further, hereinafter. The hydraulic fluid under pressure thus admitted to one or the other of the cylinders 54 and 55 will move one or the other of the pistons 57 and 58 so as to apply power for the rotation of a lever 59 on a fixed pivot 60, having a yoke 61 carrying between its arms a worm gear 62 which is guided in a worm wheel 63 rotatable on a steering column 64 longitudinally movable in the worm 63, provided with a steering wheel 65 thereon, the lower end of which extends into a housing 66 connected to the cylinders 54 and 55 and in which the fixed pivot 60 is located. The steering column 64 has an end of reduced diameter, forming a master cylinder operating rod 67, the rod 67 being arranged to reciprocate with the steering column 64 due to a worm connection 68 formed on the outside of the steering column 64 with which it is connected by an internal worm 68a formed in the worm 63. In this way, by the rotation of the steering wheel 65 an upper master cylinder piston 69 and a lower master cylinder piston 70, fastened to the rod 67, may be raised or lowered between a master cylinder 71 and a master cylinder 72, said cylinders being connected, respectively, by pipes 73 and 74 to inlets 75 and 76 on the steering valve mechanism for the operation of the valves therein alternately and so as to supply power either to the cylinder 54 or the cylinder 55, as desired, in order to aid in the operation of the steering control mechanism, as referred to hereinafter. An outlet opening 77 leads from the steering valve mechanism 46 to a pipe 78 which is connected to a return pipe 79 having an emergency branch connection 80 normally closed by a screw plug 81 to the main hydraulic liquid supply pipe 42. This return pipe 79 is connected by a branch pipe 82 to a check valve 83 having a valve seat 84 on which it is normally pressed into seated position by a helical spring 85. This valve 83, 84 gives access, by means of a pipe 86, to an inlet 87 into the outer return annular chamber 25 located in the pressure accumulator 26. Also, the said branch pipe 79 has a branch connection 88 and another branch connection 89 which lead to outlets 90 and 91, respectively, to carry off any leakage from the valves in the steering control mechanism 46.

Brake Apparatus

Similarly, the return pipe 78 has a connection 92 leading to the upper portion of the brake valve 47 so as to carry off any leakage therefrom, another branch pipe 93 to carry off discharged liquid from the brake valve 47, and still another branch pipe 94 to carry off any leakage from a travel coordination cylinder 95, carrying a travel coordinating plunger 96 which is moved in the operation of the brake valve mechanism 47, as referred to hereinafter. For the purpose of operating the brake valve mechanism 47, there is a manual pressure inlet 97 which is connected by a pipe 98 leading to a manual pressure cylinder or master cylinder 99 having an air bleeder valve 100 of any desired kind therein, and a reaction spring 101 which normally forces upwardly a plunger 102, as referred to further, hereinafter, but which has, in general, a plunger rod 103 for operating the same, operated by a treadle 104. It will be understood that as the treadle 104 is depressed, hydraulic power liquid from the brake valve mechanism 47 will be delivered by outlets 105 and 106 to brake lines 107 and 108, respectively, which, respectively, lead to front wheel brake operating cylinders 109 and 110 and rear wheel brake operating cylinders 111 and 112. The pressure exerted on the wheel brakes by means of said cylinders 109, 110, 111, and 112 is, also, coordinated with the movement of the treadle 104 by reason of the fact that the travel coordinating piston 96, which has a seal 113, is moved according to the pressure delivered to the pipes 107 and 108, so as to increase coordinately the volume provided for the manually moved liquid in the pipe 98.

The unloading valve 12 may be constructed as set forth in detail in my Patent No. 2,372,016 aforesaid, but, as shown in the drawings herein, the said unloading valve 12 may comprise a casing 114 into which the pipe 10 leads by means of the inlet port 11, which communicates with a valve chamber 115 in which the conical valve 22 is contained so as normally to be seated on the valve seat 23 due to the force of a helical spring 116, the lower end of which is received in a cylindrical recess 117 in the upper portion of said valve 22, said spring 116 seating at its upper end against the interior of the casing 114. This end of the spring 116 is also located around a guiding stem 118 on a removable plug 119 having a screw-thread 120 thereon. Inside the stem 118 there is a longitudinal recess 121 to receive an upper reduced end 112 of a rod 123 which fits slidably within the interior of the valve 22. The said valve 22, 23 permits the high pressure liquid from the pipe 10 to be released through an outlet opening 124 to the pipe 24 and thence to the return chamber 25 in the accumulator 26. The opening of this valve 22, 23 occurs when the pressure in the pipe 10 becomes greater than the desired maximum and the opening of said valve is accomplished by a snap mechanism, which is shown in detail in the said Patent No. 2,372,016 aforesaid. However, this comprises the plunger 21 hereinabove referred to, communicating with the pipe 19, and which is adapted to move a rod 125, and an adjustable sleeve 126 screw-threaded thereon, against the force of a helical spring 127 in the casing 114. When the rod 125 is moved in this manner it will accumulate an increasing spring pressure against a tapered flange 128 on the other side of a pair of spherical balls 129 and 130 which are held inwardly, normally, by springs 131 and 132 carried in recesses in the casing 114. The tapered flange 128, for this purpose, is carried on a spring shell 133 supporting within the same a helical spring 134, the other end of the spring being held in position by a flanged sleeve 135 resting against a split ring 136 fastened to the rod 125. The spring shell 133 also rests against another spring shell 137 movable on the rod 125 and retaining therein a helical spring 136 around a flange spring retainer 139 held in fixed position on the rod 125 by a split ring 140. This spring 137 yieldingly resists movement of the tapered projection 138 upwardly from the position shown in FIG. 1 and the spring 134 yieldingly resists the movement of the tapered flange 128 downwardly from above the position of the balls 129 and 130.

*Details of Steering and Brake Apparatus*

The steering valve mechanism comprises the inlet ports 75 and 76 for manually supplied hydraulic liquids, which may be supplied, alternately, for instance, from any desired master cylinder for the control of the steering valve mechanism 46. These inlets 75 and 76 communicate, respectively, with valve chambers 141 and 142 so as to operate valve mechanisms 143 and 144 therein, which are constructed the same as each other and only one of which will be described in detail, accordingly. The valve mechanism 143 comprises an outlet valve plunger 145 having a central bore 146 leading to a small valve chamber 147, the lower portion thereof having an inlet opening 148 to receive a valve stem 149 having a spider 150 secured thereto to cooperate with a flange 151 at the lower portion of the outlet valve plunger 145. This spider 150 cooperates with a helical valve-seating spring 152, the upper end of which rests against an internal flange 153 in said plunger 145 so as to provide a valve seat 154 for a conical liquid compensation valve 155 which is arranged to be unseated by the valve rod 149 contacting with the valve casing, in the lowermost position of the valve plunger 145. Said valve plunger 145, furthermore, has peripheral openings 156 to communicate with flutings 156a on a valve plunger 156b, an annular chamber 157 in the valve casing and thence with a passageway 158, passing across the interior of the valve casing of the valve mechanism 46 to the other similarly constructed valve 144 and leading to a vertical passageway 159. The upper end of the vertical passageway 159 leads to the high pressure chamber 49 where it has a valve seat 160 normally closed by a liquid compensating conical check valve 161 pressed against its seat by a helical spring 162 seated on the valve casing beneath the high pressure inlet port 48. Said vertical passageway 159, furthermore, leads to the discharge port 77. The upper end of the valve plunger 145 also has a valve seat flange 163 to cooperate with a conical outlet valve 164 on a valve stem 165 on the plunger 156b, around which some leakage takes place for compensation through the valve 155. The valve stem 165 passes upwardly through a passageway 166 and has at its upper portion a conical inlet valve 167 cooperating with a valve seat 168 and provided on its upper portion with a spring-retaining cylinder 169 having therein a helical inlet valve-seating spring 170 seated against the interior of the valve casing, and in communication with the discharge pipe 88. This discharge pipe 88, as above referred to, communicates with the discharge pipe 79 which, likewise, leads to the discharge pipe 92 from the brake control valve 47. Also, it will be noted that the high pressure pipe 44 which communicates with the inlet 48 in the steering control valve mechanism 46, is also connected by a pipe 171 to a high pressure inlet port 172 on the brake control valve mechanism 47.

The brake control valve mechanism 47 contains therein a valve device 173 which is constructed the same as the valve devices 143 and 144 just described, and which, accordingly, will not be described in detail. This valve mechanism 173, as shown in FIG. 1, may comprise, as in the case of the valve devices 143 and 144, an inlet valve 174, 175 and an outlet valve 176, 177. The inlet valve 174, 175 and the outlet valve 176, 177 communicate with a transverse passageway 178 which leads to a plunger chamber 179 having within the same a plunger 180, normally pressed upwardly by a strong spring 181 and so constructed as to be compressed in accordance with the degree of the hydraulic pressure delivered by the outlet port 105 to the wheel brake cylinders 109, 110, 111 and 112. Furthermore, this plunger 180 extends downwardly through a passageway 182 into a cylinder 183 having therein the piston 96 hereinabove referred to, which is provided for the purpose of coordinating the travel of the treadle 104 with the pressures which are delivered through the outlet port 105 of the wheel brake cylinders 109, 110, 111 and 112. As above stated, this piston 96 has the discharge chamber 95 below the same connected by the pipe 94 to carry off any leakages of liquid to the discharge pipe 92. The cylinder 183 above the piston 96 is connected by a passageway 184 to a plunger chamber 185 for receiving hydraulic liquid under manually applied pressure from the inlet 97 by means of the pipe 98. The portion of this valve mechanism which includes the pressure responsive plunger 180 and the travel coordinating piston 96 is also described in detail in my copending application upon Brake Valve Mechanism, Ser. No. 440,995, now Patent No. 2,896,666. The manual pressure liquid in the pipe 98, and which is supplied by the position of the treadle 104 operating between adjustable stops 186 and 187 in a floor-board plate 188 by the movement of the plunger 102 in the plunger chamber 99 having a peripheral seal 189, is constructed so as to operate a link 190 and lever 191 leading to the plunger 102. The details of the brake treadle mechanism which may be used for this purpose may be constructed in accordance with the subject matter of my copending application upon Brake Pedal Mechanism, Ser. No. 440,996, now Patent No. 2,928,293.

The power steering unit may comprise the steering column 64 adapted to be rotated for steering the automobile by means of the steering wheel 65. For this purpose, the steering column 64 passes through the worm wheel 63 which, by the operation of the gear 62 and and movement of the bifurcated lever 59 on its pivot 60, rotates a steering arm 192 having a pivotal connection 193 to the steering rod extending across the automobile in the usual way and attached to the pivotal supports of the front wheels of the automobile for guiding the same (not shown). This movement of the steering arm 192 is, furthermore, aided by the application of power to the lever arm 59 by the pistons 57 and 58 which cooperate with a wheel 194 on a pivot 195 upon receiving high pressure liquid delivered by the pipes 52 and 53 from the steering valve mechanism 46. The modulated amounts of this high pressure liquid to accomplish this purpose are determined by the delivery of the master cylinder liquid under the manual pressure, by means of the pipes 73 and 74 which lead, respectively, to ports 196 and 197 on the power steering unit. These ports 196 and 197 communicate, respectively, with an upper master cylinder 198 in which the piston 69 reciprocates and a lower master cylinder 199 in which the lower piston 70 reciprocates. These two chambers may have screw-threaded air bleeder valves 200 and 201, respectively, and the cylinders 54 and 55 may have similar screw-threaded air bleeder valves 202 and 203, respectively. Each of said valves has an internal removable screw 204, in the usual manner, to permit accumulated air to escape, when desired. The two pistons 69 and 70 are located around the longitudinally shiftable stem or rod 67 to which they are fastened by a bearing 205 having ball races 206 and balls 207, and said rod 67 has thereon the external worm gear 68 cooperating with the internal worm gear 68a formed in the lower end of the worm 63, which is located around the steering column 64. The pistons 69 and 70, furthermore, may be connected together by adjusting screws 208, one of which is shown, located in threaded sockets 209 and 210, respectively. It will be noted, furthermore, that the pistons 69 and 70, respectively, are yieldably supported with regard to a central chamber 211 extending into a peripheral recess 212. Furthermore, the two plungers 69 and 70 are pressed apart outwardly to the limits of their positions, as determined by the said screws 208 which are adjacent to two spring-retaining rings 213 and 214, the outer edges of which are limited in their outward movement by shoulders 215 and 216 extending into the peripheral recess 212 inside the casing, a helical spring 217 being located between the rings 213 and 214 for this purpose. In this way, by the rotation of the steering wheel 65 the rod 67 may be forced downwardly or upwardly by the worms 68 and 68a so as to move the pistons 69 and 70 upwardly or downwardly and, thus, deliver manual pressure liquid through to one or the other of the pipes 73, 74 for the operation of the valves 143 and 144 to deliver the pressure liquid to the power cylinders 54 or 55, thus aid the rotation of the steering wheel 65, as desired.

*Operation*

In the operation of my invention, whenever the vehicle is being operated to steer the same, the steering wheel 65 will be rotated in the direction desired. This will result in the liquid being forced to one or the other of the master cylinder pipes 73, 74 so as to operate one or the other of the valves 143 and 144, thus admitting pressure liquid to one of the inlet valves 167, 168 after closing the corresponding outlet valve 163, 164. This will supply the pressure liquid derived from the gear pump 1, the maximum available pressure of which is determined by the unloading valve 12, and which is maintained at a uniform pressure by accumulator 26.

This pressure will accumulate by passing into the passageway 30 and thence through the perforations 29 or through the porous material 235 into the inner chamber 33 around the compressible annular container 34 containing air or any other gas which has been introduced through the nozzle 38 at any desired pressure. The container 34 will be compressed by the liquid in the surrounding chamber 33 to the extent permitted by the pressure of the surrounding liquid and will thence be expelled through the apertures 29 or the porous cylinder 236 to the outlet chamber 31 and from there into the system to operate the various pairs of self-lapping valves for the control of the accessories to which they are connected. The pressure in the accumulator 26 will, of course, be regulated according to the operation of the unloading valve 12, which is subjected to the line pressures through the pipe 19. The location of the low pressure chamber 25 outside the inner high pressure chamber 33 will tend to equalize the temperatures present in the chamber 33 produced by the expansion and contraction of the flexible compressible container 34. However, the arrangement is such as to enable the flexible container 34 to be inflated readily by the removal of the cap 40, which latter, when in place, also permits the very gradual escape of any accumulated air through the porous material 40a therein. Also, it will be noted that the cylinders 235 and 236 act as strainers, which are also removable and replaceable to prevent extraneous solid materials reaching the flexible container 34. This arrangement is facilitated, also, by reason of the removable baffle 32 between the cylinders 235 and 236.

This delivered pressure liquid from the accumulator 26 will be received in one or the other of the cylinders 54 and 55 so as to move the steering arm 192. The steering of the vehicle in the opposite direction will be accomplished in the same, but reverse, manner by moving the steering wheel in the opposite direction, thus supplying the pressure liquid to the other one of the cylinders 54, 55 while simultaneously releasing the pressure liquid from the other one of said cylinders by the closing of the appropriate inlet valve 167, 168 and the opening of the corresponding outlet valve 163, 164. The discharged liquid will pass out by the pipe 77 to the pipe 79 through the check valve 83, 84, thence to the annular chamber 25 and back to the inlet side 9 of the gear pump 1. The control of the brakes will take place in a similar manner, and which is operable in a similar way from the same power source, in an advantageous manner, inasmuch as, generally, only one or the other thereof is being operated at a given time.

In the operation of the brakes for instance, the master cylinder 99 is operated by the movement of the plunger 102 therein from the treadle 104, the master cylinder being always replenished with liquid by the residual pressure of the liquid from the system through the pipe 98, whether or not the air bleeder 100 is opened. However, in case of the accumulation of any air in the master cylinder 99, this can be removed from time to time, as desired, by opening the air bleeder 100, through which the air is eliminated by the force of the residual pressure present in the system. In this instance, the downward movement of the treadle 104 will move the plunger 102 to supply manual pressure liquid through the pipe 98 to the chamber 185 so as to close the outlet valve 176, 177, followed by the opening of the inlet valve 174, 175 which admits pressure liquid from the pipe 171 to be supplied by the passage 178 to the pressure chamber 179 and by the pipes 107 and 108 to the front and rear wheel brake cylinders 109, 110, 111 and 112. This increase of pressure in the chamber 179 will cause the travel-coordinating piston 96 to move downwardly, thus increasing the volume in the chamber 183 and requiring the treadle 104 to have a travel which is coordinate with the pressure in the pressure chamber which delivers the pressure liquid to the wheel brakes. Any leakage from the travel piston 96 or from the valves 176, 143 and 144 will be carried off by the discharge pipes connected thereto through the inlet side 9 to the gear pump 1. Also, it will be noted that in the retracted positions of the valves 176, 143 and 144 the liquid compensating valves 154, 155 in the lower portions thereof will be opened by contact of the valve stems 149 thereof with the respective valve casings, thus opening the compensating valves to admit or discharge any required equalizing amounts of the liquid in the system.

The residual check valve 83 in the return to the accumulator traps fluid in the hydraulic lines of the low pressure and high pressure sections to maintain a residual pressure. Whenever any modulating valve is opened (for example, the modulating valve 143 or 144 of the steering valve mechanism 46) pressure fluid is admitted from the accumulator to the lines leading to the work producing element (for example, to the cylinders 54 or 55) associated with the particular valve. Upon the retraction of the modulating valve (143 or 144) the pressure fluid is drained from the element and returned via the valve and the return line (77, 78, 79) through the residual check valve 83 to the accumulator. The residual check valve 83 closes when the pressure in the return line 79 drops to the residual pressure.

The liquid compensation means between the sections of the hydraulic circuit, for instance, served by the valve 155 between the line 73 leading to the low pressure master cylinder 71 and the line 52 leading to the power cylinder 54, is effective to maintain communication between such sections upon retraction of the master cylinder piston (69). Such liquid compensation means, described more fully in my copending application Serial No. 440,993, above referred to, now Patent No. 2,896,733, opens when the pressure in the low pressure section tends to drop below the residual pressure prevailing in the high pressure section and return line 77, 78, 79, to admit fluid therefrom to the lines to the master cylinder thereby keeping these lines filled and the seals closed.

Since all circuits are connected to a common return line 79, if the pressure in the return line 79 tends to drop below the residual pressure at which the check valve 83 closes, caused by loss of fluid from the circuit (from leakage, bleeding, during repair, or the like), fluid may be supplied to the lines from the accumulator by opening any modulating valve or by means of the "emergency" valve 81 which may be cracked open to supply fluid from the high pressure line 42.

While I have described my invention above in detail I wish it to be understood that many changes may be made therein without departing from the spirit of the same.

I claim as my invention:

1. In a hydraulic control system including a reservoir, the combination comprising, a hydraulic circuit having a low pressure return for returning fluid to the reservoir, a normally closed bleeder at times having a connection to the fluid in said low pressure return, and means connected in said hydraulic circuit apart from said reservoir for maintaining a residual fluid pressure in the connection to said bleeder, said residual pressure being effective to force air and fluid in said bleeder connection through said bleeder when the latter is open and connected to the return.

2. In a hydraulic control system, the combination comprising, a hydraulic circuit having separate sections connected to a common fluid pressure source, normally closed bleeders having connections to the fluid in said sections, and means connected in said hydraulic circuit between said source and said sections for supplying fluid from said fluid pressure source to said sections to maintain a residual pressure in the latter, said residual pressure being effective to force air and fluid in said low pressure section through said bleeder connections when the bleeders are open.

3. In a hydraulic control system, the combination comprising, a hydraulic circuit having a high pressure section and a low pressure section, means including an accumulator connected to said high pressure section for maintaining the fluid therein at a predetermined pressure, a normally closed bleeder having a connection to the fluid in said low pressure section, and means connected in said hydraulic circuit between said sections for supplying fluid from said high pressure section to said low pressure section to maintain a residual pressure in the latter, said residual pressure being effective to force air from the fluid in said low pressure section through said bleeder connection when the bleeder is open.

4. In a hydraulic control system, the combination comprising, a hydraulic circuit having a high pressure section and a lower pressure section, a master cylinder in said low pressure section having a piston for modulating the pressure therein, a bleeder connection to the fluid in said low pressure section, and means connected in said hydraulic circuit between said sections for supplying fluid from said high pressure section to said low pressure section to maintain a residual pressure in the latter upon retraction of said master cylinder piston, said residual pressure being effective to force air from the fluid in said low pressure section through said bleeder connection.

5. In a hydraulic control system, the combination comprising, a hydraulic circuit having a high pressure section and a low pressure section, a bleeder connection to the fluid in said low pressure section, and means including a liquid compensation valve between said sections for maintaining a residual fluid pressure in said low pressure section, said residual pressure being effective to force air from the fluid in said low pressure section through said bleeder connection.

6. In a hydraulic control system, the combination comprising, a hydraulic circuit having a high pressure section and a low pressure section, a master cylinder in said low pressure section having a piston for modulating the pressure therein, a bleeder connection to the fluid in said low pressure section, and means including a liquid compensation valve between said sections for maintaining a residual fluid pressure in said low pressure section upon retraction of said master cylinder piston, said residual pressure being effective to force air from the fluid in said low pressure section through said bleeder connection.

7. In a hydraulic control system, the combination comprising, a hydraulic circuit having a high pressure section and a low pressure section, a master cylinder in said low pressure section having a piston for modulating the pressure therein, a bleeder connection on said master cylinder, and means including a liquid compensation valve between said sections for maintaining a residual fluid pressure in said low pressure section upon retraction of said master cylinder piston, said residual pressure being effective to force air from the fluid in said low pressure section through said bleeder connection.

8. In a hydraulic system, the combination comprising, a hydraulic circuit having a pressure fluid source and separate high and low pressure sections connected through a common return to said source, means including a residual valve in said return for maintaining residual pressure above a predetermined value in said sections, a normally closed bleeder having a connection to the fluid in said high pressure section, said residual pressure being effective to force air and fluid in said high pressure section through said bleeder when the latter is open, and means for supplying fluid from said source to said high pressure section to replenish fluid bled through said bleeder.

9. In a hydraulic control system, the combination comprising, a hydraulic circuit having a pressure fluid source and separate high and low pressure sections connected through a common return to said source, means including a residual valve in said return for maintaining residual pressure above a predetermined value in said sections, a normally closed bleeder having a connection to the fluid in said low pressure section, said residual pressure being effective to force air and fluid in said low pressure section through said bleeder when the latter is open, and means for supplying fluid from said source to said low pressure section to replenish fluid bled through said bleeder.

10. In a hydraulic control system, the combination comprising, a hydraulic circuit having a pressure fluid source and separate high and low pressure sections connected through a common return to said source, means including a residual valve in said return for maintaining residual pressure above a predetermined value in said sections, normally closed bleeders having connections in said high and low pressure sections respectively, said residual pressure being effective to force air and fluid in said sections through said bleeders when the latter are open, and means for supplying fluid from said source to said sections to replenish fluid bled through said bleeders.

11. In a hydraullic system for controlling a plurality of pressure fluid operated work producing elements, the combination comprising, a hydraulic circuit including a source of high pressure fluid, a plurality of fluid pressure modulating devices connected to receive high pressure fluid from said source, lines for conveying modulated pressure fluid from said devices to said elements respectively, normally closed bleeders connected to the fluid in said lines, a common low pressure return from said modulating devices to said source, and means including said return for maintaining a residual pressure in said lines to said elements, said residual pressure being effective to force air and fluid from said lines through said bleeders when said bleeders are open, said hydraulic circuit having means for supplying fluid from said source to said lines to replenish fluid bled through said bleeders.

12. In a hydraulic system for controlling a plurality of pressure fluid operated work producing elements, the combination comprising: a hydraulic circuit including a source of high pressure fluid, a plurality of fluid pressure modulating devices connected to receive high pressure fluid from said source, manual means connected by low pressure lines to operate said modulating devices, lines for conveying modulated pressure fluid from said devices to said elements, and a common low pressure return from said modulating devices to said source; means including a residual valve in said return for maintaining residual pressure in said return, in said modulated pressure fluid lines, and in said low pressure lines; means including a normally closed bleeder connected to the fluid in said lines for bleeding air and fluid therefrom, said residual pressure being effective to force air and fluid through said bleeders when said bleeders are open; and means for supplying fluid to said lines to replenish fluid bled through said bleeders including a normally closed connection from said source to said low pressure return, and means in said normally closed connection for selectively admitting pressure fluid therethrough.

References Cited in the file of this patent

UNITED STATES PATENTS

| | | |
|---|---|---|
| 1,786,912 | Madden | Dec. 30, 1930 |
| 2,179,201 | Scott | Nov. 7, 1939 |
| 2,419,977 | Wellbrock | May 6, 1947 |
| 2,597,404 | Teske | May 20, 1952 |
| 2,645,314 | Lackinger | July 14, 1953 |
| 2,688,335 | Gunderson | Sept. 7, 1954 |
| 2,896,733 | Rockwell | July 28, 1959 |